US012806880B2

(12) United States Patent
Thomke et al.

(10) Patent No.: US 12,806,880 B2
(45) Date of Patent: Nov. 24, 2026

(54) BENT AND MULTILAYER PIPE

(71) Applicant: TI Automotive (Fuldabrueck) GmbH, Fuldabrueck (DE)

(72) Inventors: Thorston Thomke, Baunatal (DE); David Gabbey, Pinckney, MI (US); Brian Vanosdale, Rome City, MI (US)

(73) Assignee: TI Automotive (Fuldabrueck) GmbH, Fuldabrueck (DE)

( * ) Notice: Subject to any disclaimer, the term of this patent is extended or adjusted under 35 U.S.C. 154(b) by 596 days.

(21) Appl. No.: 18/037,199

(22) PCT Filed: Nov. 16, 2021

(86) PCT No.: PCT/IB2021/060578
§ 371 (c)(1),
(2) Date: May 16, 2023

(87) PCT Pub. No.: WO2022/101883
PCT Pub. Date: May 19, 2022

(65) Prior Publication Data

US 2023/0405963 A1 Dec. 21, 2023

(30) Foreign Application Priority Data

Nov. 16, 2020 (EP) .................................... 20207866

(51) Int. Cl.
*B32B 1/08* (2006.01)
*B32B 7/025* (2019.01)
(Continued)

(52) U.S. Cl.
CPC ................ *B32B 1/08* (2013.01); *B32B 7/025* (2019.01); *B32B 27/08* (2013.01); *B32B 27/20* (2013.01);
(Continued)

(58) Field of Classification Search
CPC B32B 1/08; B32B 7/025; B32B 27/08; B32B 27/20; B32B 2250/04;
(Continued)

(56) References Cited

U.S. PATENT DOCUMENTS 10,662,309 B2 5/2020 Martin et al.
2018/0072861 A1 * 3/2018 Martin ............... C08G 18/3206

FOREIGN PATENT DOCUMENTS

DE 102014116819 A1 5/2016
EP 2476938 A1 7/2012
(Continued)

OTHER PUBLICATIONS

English machine translation for JP2011169467. (Year: 2011).*
(Continued)

*Primary Examiner* — Michael C Miggins
(74) *Attorney, Agent, or Firm* — DICKINSON WRIGHT PLLC

(57) ABSTRACT

A pipe (1) comprises at least one first layer (3) and one second layer (2), wherein the first layer (3) has a first plastic K1, wherein the first plastic K1 has a conversion temperature $T_{UK1}$. The second layer (2) comprises a second plastic K2, wherein the second plastic K2 has a conversion temperature $T_{UK2}$. The first layer (3) has an aggregate Z, wherein aggregate Z is not a polymer or copolymer. Aggregate Z is preferably a solid, wherein the solid is a semiconductor or nonconductor Aggregate Z facilitates the dielectric heating of the pipe.

17 Claims, 2 Drawing Sheets

(51) Int. Cl.
*B32B 27/08* (2006.01)
*B32B 27/20* (2006.01)

(52) U.S. Cl.
CPC ....... *B32B 2250/04* (2013.01); *B32B 2250/24* (2013.01); *B32B 2264/102* (2013.01); *B32B 2264/303* (2020.08); *B32B 2305/30* (2013.01); *B32B 2307/202* (2013.01)

(58) Field of Classification Search
CPC .......... B32B 2250/24; B32B 2264/102; B32B 2264/303; B32B 2305/30; B32B 2307/202; B32B 2250/02; B32B 2250/03; B32B 2264/1022; B32B 2264/1024; B32B 2264/1025; B32B 2307/204; B32B 2597/00; B32B 7/027; B32B 27/286; B32B 27/288; B32B 27/306
See application file for complete search history.

(56) References Cited

FOREIGN PATENT DOCUMENTS

| | | | |
|---|---|---|---|
| EP | 3298055 | A1 | 3/2018 |
| JP | 2011169467 | A | 9/2011 |
| WO | 2016187442 | A1 | 11/2016 |

OTHER PUBLICATIONS

Japanese Office Action for JP2023-528644 dated Aug. 20, 2024.
International Search Report and Written Opinion dated Jan. 20, 2022.

* cited by examiner

BENT AND MULTILAYER PIPE

RELATED APPLICATIONS

The present patent document is a § 371 of international PCT Application No. PCT/IB2021/060578, filed Nov. 16, 2021, which claims priority to European Application No. 20207866.3, filed Nov. 16, 2020, the entire contents of which are incorporated herein by reference.

FIELD

The disclosure relates to a pipe, comprising at least one first layer and one second layer, wherein the first layer has a first plastic K1, wherein the second layer comprises a second plastic K2, wherein the first layer has an aggregate Z, wherein aggregate Z is a solid, wherein aggregate Z has or essentially has no polymer or copolymer, wherein aggregate Z facilitates the dielectric heating of the first layer and the pipe.

BACKGROUND

For example, such multilayer plastic pipes are known from DE 696 13 130 T2. As a consequence, an aggregate such as water or a softener is used to achieve a high enough dielectric heating of the plastic materials given a high frequency excitation. Minimum values with respect to the relative permittivity εr and loss factor d are recommended for the pipe, so that the dielectric heating, and thus also the bendability, of the pipe is large enough in the area of the bending points.

Further known are multilayer plastic pipes—among other things from EP 1 182 345 A1, EP 2 476 938 A1 and EP 1 452 307 A1—in which individual or several layers are provided with an aggregate. For example, the aggregate can involve conductive soot or graphite fibrils.

However, we have found one of the problems encountered during the development of multilayer pipes with aggregate is that the pipe loses specific, desired properties in some cases after dielectric heating. For example, it happens that the barrier property of a barrier layer partially or entirely diminishes, which can be readily confirmed via before and after tests. In other cases, it should be noted that the pipe does not retain its bending shape after dielectric heating.

SUMMARY

Therefore, one object of the disclosure is to indicate a multilayer pipe that has good material properties and expediently also retains its bending shape even after dielectric heating.

In order to achieve the aforementioned object, the present disclosure recommends a pipe comprising at least one first layer and one second layer, wherein the first layer has a first plastic K1, wherein the first plastic K1 has a conversion temperature TUK1, wherein the second layer comprises a second plastic K2, wherein the second plastic K2 has a conversion temperature TUK2, wherein the first layer has an aggregate Z, wherein aggregate Z has no polymer or copolymer.

According to further aspects, an imaginary portion of a relative permittivity standardized by the electric field constant is allocated to the first plastic K1, and referred to as absorption factor AK1, and an imaginary portion of a relative permittivity standardized by the electric field constant is allocated to the second plastic K2, and referred to as absorption factor AK2, wherein an imaginary portion of a relative permittivity standardized by the electric field constant is allocated to aggregate Z, and referred to as absorption factor AZ, wherein an absorption factor AS1 is allocated to the first layer (2) and an absorption factor AS2 is allocated to the second layer (3), wherein absorption factors AK1 and AZ at least codetermine the absorption factor AS1 via their mixing ratio in the first layer (2), wherein an absorption factor AK2 of the second plastic K2 at least codetermines absorption factor AS2, wherein absorption factor AZ is larger than absorption factor AK1.

The aggregate Z is preferably a solid, wherein the solid is a semiconductor or nonconductor.

The term "semiconductor" preferably refers to materials having an electrical conductivity of at most 104 S/cm. The electrical conductivity of semiconductors preferably and advantageously measures at least 10-8 S/cm. The electrical conductivity of electrical conductors expediently lies above that of semiconductors, while that of nonconductors lies thereunder.

It is preferred that the solid be in a solid aggregate state at 20° C., and thus be neither fluid nor gaseous. It is preferred that the melting or decomposition temperature of the solid be larger than that of the first plastic.

In particular, the term "layer" refers to a single layer of a pipe wall, wherein the pipe wall has several layers that follow each other in sequence from radially inside to radially outside. A layer preferably consists of a uniformly mixed material, which has one material component or several material components. A layer expediently comprises at least one plastic, wherein the plastic can be provided with an aggregate. The term "plastic" preferably refers to individual polymers, copolymers and/or polymer blends.

With respect to the conversion temperature TUK1 and TUK2, it applies in each case that the latter corresponds to the respective melting or decomposition temperature of the respective plastic minus the room temperature TR of 20° C. The following applies for a thermoplastic K1 with a melting temperature TSK1 for TUK1:

$$T_{UK1}=T_{SK1}-T_R$$

In the case of thermosetting or non-thermoplastic plastics, the conversion temperature TUK of the thermosetting plastic corresponds to its decomposition temperature minus 20° C.

The terms "electric field constant" ε0, "relative permittivity" εr and other designations for electrical quantities are preferably to be understood within the meaning of the DKE-IEV Dictionary of the Association of German Engineers (=Standards Series 60050, Status: Oct. 1, 2019). As a consequence, the complex permittivity ε can be written as follows:

$$\varepsilon=\varepsilon'+i\varepsilon''$$

wherein the complex permittivity ε can be standardized via the electric field constant ε0:

$$\varepsilon_r=\varepsilon/\varepsilon_0=\varepsilon'/\varepsilon_0+i\,\varepsilon''/\varepsilon_0=\varepsilon_r'+i\varepsilon_r''$$

wherein εr' is the real part of the relative permittivity, and often referred to as dielectric constant k'. However, the term "constant" is not entirely accurate, because k' depends not only on material, but also on frequency and temperature. The imaginary part of relative permittivity εr" is often referred to as "dielectric loss", which will be explained further below. The ratio $$\varepsilon_r''/\varepsilon_r' = \varepsilon''/\varepsilon' = \tan\delta = d$$

is referred to as "dielectric loss factor" d, wherein δ represents the angle between the imaginary and real part, and is called the loss angle. In the English-speaking world, the dielectric loss factor d is often referred to as "loss tangent" or "dissipation factor".

It is customary to express the dielectric properties of materials in the form of a real part of the relative permittivity εr' on the one hand, and of the dielectric loss factor d on the other. While εr' describes the proportion of electromagnetic radiation coupled into the respective material, d expresses the proportion of coupled radiation that is absorbed in the material. As a consequence, the product of these two quantities, i.e., $$\varepsilon_r' \cdot d = \varepsilon_r' \cdot \varepsilon_r''/\varepsilon_r' = \varepsilon_r''$$

and hence the dielectric heat loss εr", is proportional to the coupled and absorbed heat quantity. The proportionality is as follows:

$$p = P/V = \varepsilon_r''\omega\,\varepsilon_0 E^2 = \varepsilon''\omega E^2$$

wherein E2 describes the electric field strength squared, ω the circular frequency, P the power dissipation, V the volume of the dielectric material, and p the power dissipation density. The electric field is here generated by an electromagnetic radiation source, for example, whose circular frequency ω as well as whose electric field strength E quite decisively determine the power dissipation P, and are by far the most important parameters.

On the other hand, dielectric loss εr" and ε" are by far the most important parameters on the material or pipe side, and have a greater informative value with respect to heat losses in the dielectric material than—each taken separately—the real part of permittivity εr' and the dielectric loss factor d.

For example, the dielectric parameters εr' and εr" can be determined via an oscillating circuit arrangement, in which a measuring capacitor is also located in addition to a coil with a fixed inductivity L. The former is designed in such a way that it can accommodate a dielectric sample, so that εr' and εr" can be determined by determining the resonance frequency and quality of the oscillating circuit. In addition, there exist numerous other generally known measurement methods that differ particularly in terms of the measurement outlay and examinable spectrum of εr'(ω) and εr"(ω).

Since both εr' and εr" depend on frequency and temperature, any amount of time desired can be expended for measuring just one of these parameters. For this reason, only εr" will be determined below at 25° C. and 10 MHz (a frequency lying within the spectrum for dielectric heating), wherein a material-dependent absorption factor A will be defined for the sake of typographic simplicity:

$$\varepsilon_r''(25\ ^\circ\mathrm{C},\ 10\ \mathrm{MHz}) = A$$

As a consequence, all numerical values for absorption factors mentioned here relate to values at 25° C. at 10 MHz or 107 Hz, thereby establishing in particular a good comparability with values from the literature. In this regard, for example, reference is made to the standard reference "DIELECTRIC MATERIALS and APPLICATIONS" by Author R. von Hippel, Wiley Verlag, 1954. In the value tables disclosed therein, the two values εr'=εr'/ε0 and tan δ=ε"/εr' at 25° C. and at 107 c/s (=107 Hz) are to be multiplied by each other, thereby yielding the material-dependent value εr" (25° C., 10 MHz)=A.

However, it is often difficult if not impossible to separate plastics K1 and K2 from aggregate Z in such a way that the dielectric properties of plastics K1 and K2 do not change during liquefaction or separation. However, the plastic of a sample of the first layer can be completely removed, e.g., via incineration or dissolution, for example, without changing the dielectric properties of aggregate Z. By determining absorption factor AZ as well as by determining absorption factor AS1 and the mixing ratio between the weight proportion GK1 of the plastic and the weight proportion GZ of aggregate Z, the respective absorption factor AK1 can be determined:

$$G_{K1} \cdot A_{K1} + G_Z \cdot A_Z = A_{S1}$$

wherein the weight proportions GK1 and GZ are dimensionless quantities, and yield 1 when added together. GK1 and GZ are determined via the weight of a sample of the first layer before removing the plastic K1 and via the weight of the remaining aggregate Z. An analogous procedure can be followed for a sample of the second layer for determining AK2. After conversion of the preceding equation, AK1 can be calculated as follows:

$$A_{K1} = \frac{A_{S1} - (G_Z \cdot A_Z)}{G_{K1}}$$

An absorption ratio AVS can then be determined, which correlates the absorption factors AS1 and AS2 of the first and second layer:

$$AV_S = A_{S1}/A_{S2},$$

wherein a sample of the respective layer material (plastic and possibly aggregate) is examined when determining AS1 or AS2. AS1 arises by mixing the materials plastic K1 with aggregate Z, wherein aggregate Z has the absorption factor AZ. In this way, a small quantity of aggregate Z with a very high absorption factor AZ can decisively influence the absorption factor AS1 of the first layer.

For example, if a ratio is formed out of the absorption factor AK1 of a first plastic K1 and an absorption factor AK2 of a second plastic K2, reference is made below to an absorption ratio AVK:

$$AV_K = A_{K1}/A_{K2}$$

The present disclosure is initially based on the understanding that individual layers are too strongly heated during dielectric heating, and can literally burn. For example, this can severely impair the barrier property of barrier layers. These layers often have a low melting point, and are thus comparatively sensitive to heat. By contrast, heat-robust layers have a higher melting point, and require a larger quantity of energy relative to mass for purposes of permanent bend formation.

It was further found that numerous compromises relative to thermal energy absorbed in the pipe are inadequate or even disadvantageous. Given an unfortunate selected compromise, it can happen both that the heat-sensitive layer burns, and that the bends in the heat-robust layers do not adjust to the bending shape to the desired extent owing to insufficient heating. In the bending process, microcracks can in some cases form in the area of the bending points of the heat-robust layers given insufficiently heated layers. Therefore, one essential finding of the disclosure is that the layers must be tailored to each other in terms of dielectric heating, and not just that the heat quantity of a layer to be absorbed has to be increased as described in DE 696 13 130 T2.

In addition, it was found that relative heat-robust layers of newly developed pipes, for example those made out of polyamide, can surprisingly also melt during dielectric heating. What made this so surprising is that the dielectric energy absorptions were neatly harmonized, and there should actually have been no instances of overheating. This discovery is based on the knowledge that electrically conductive materials, for example conductive soot, lead to a strong overheating of the respective layer, which can distinctly exceed the pure dielectric heating.

It was likewise found that very many—if not all—softeners can greatly increase conductivity. Softeners (including water) are often semiconductors or nonconductors, and most often liquid, and increase the conductivity by increasing the mobility of the ions. According to the disclosure, only solids are thus considered as aggregates.

By contrast, the inventive use of an aggregate Z in the form of a solid semiconductor or nonconductor inventively avoids or greatly diminishes the effect of overheating because of too high an electrical conductivity. As a result, heating is essentially confined to dielectric absorption, which is very well adjustable with semiconducting or nonconducting solids.

The disclosure is further based on the knowledge that the dielectric absorption of a multilayer pipe with n layers can be adjusted in two or three ways. In the first case, the dielectric absorptions of the at least two layers are tailored to each other and preferably also to the respective melting temperature via the at least one aggregate. As a consequence, all layers are in the first case softened to a similar extent within the same time during dielectric heating.

In a second case, not all layers are softened in the equally similar manner over the same period of time. For example, given n-layers, only n-1, n-2, n-3 or n-4 or even fewer layers are provided with an aggregate Z or various aggregates Z, X, Y. Preferably only the layers with aggregate Z, X, Y develop so much heat over a short time that their plastic is sufficiently softened, and they can permanently take over bending deformation. In a first subcase, these layers are additionally sufficiently thick or mechanically stable, so that they keep the pipe as a whole—and in particular the layers with too little heat development or softening—in the bent shape.

In a second subcase, the layers with aggregate are not thick enough to sustain bending deformation. However, it is instead ensured over a correspondingly large timespan of dielectric heating that the layers with aggregate are exposed to dielectric heating for longer than actually required. A large enough portion of thermal energy is then radiated to the other layers, which causes them to be sufficiently softened.

These two cases or three subcases require a precise adjustment of dielectric heating. This is achieved with an aggregate Z, which according to the disclosure is a semiconducting or nonconducting solid, and has an absorption factor AZ larger than AK1.

It is especially preferred that the electrical conductivity of the pipe in the longitudinal direction of the pipe be less than 10-8 S/m or than 10-9 S/m or than 10-10 S/m or than 10-11 S/m. in order to determine the electrical conductivity of the pipe at both ends, it is expedient that contacting take place preferably along the entire respective end face. Because the unit of electrical conductivity has a length reference, short or very short partial pieces, e.g., with a length of 10 mm or even 1 mm, can be cut out of the pipe and measured. Due to the constant pipe cross section, the resultant values in units S or Ω can be readily related to the length 1 m, and hence to the S/m unit, through conversion. The cuts are expediently made perpendicular to the pipe axis, and advantageously smoothened, for example via polishing or similar procedures. The layers of the pipe preferably represent a parallel circuit of different resistors. The electrical conductivity of the pipe in the longitudinal direction of the pipe is typically determined based on the parallel circuit above all by the most electrically conductive layer.

It is especially advantageous that absorption factor AZ be larger than absorption factor AS2 or AK2. Absorption factor AZ is preferably larger than AS2 or AK2 by at least a factor of 1.5 or 2 or 2.5 or 3. This serves to dielectrically adjust the layers to each other.

It is likewise very advantageous for adjusting the layers to each other that absorption factor AS2 or AK2 be larger than AK1. The absorption factor AS2 or AK2 is preferably larger than AK1 by at least a factor of 1.5 or 2 or 2.5 or 3.

It is very preferable that the plastic K1 of the first layer comprise a polymer selected from one of the polymer classes "aromatic polyamide (PA), aliphatic PA, partially aromatic PA, polyester (PES), polyetherketone (PEK), ethylene-vinyl alcohol copolymer (EVOH), fluoropolymer (FP), polyvinylidene chloride (PVDC), polyphenylene sulfide (PPS), polyurethane (PU), thermoplastic elastomer (TPE), polyolefin (PO)", wherein the plastic K2 of the second layer (2) comprises a polymer selected from another of the mentioned polymer classes. The background to this consideration is that above all polymers of varying polymer classes require dielectric adjustment.

It is possible for the pipe to have a further layer or further layers made out of plastic, wherein the further layer or the further layers preferably has or have aggregate Z. The plastic of the further layer/the further layers advantageously comprises a polymer from the polymer class of plastic K1. It is especially preferable that plastic K1 comprise the same polymer as the further layer/the further layers. The first layer and the further layer/the further layers can have the same plastic K1. The second layer can be arranged between the first layer and the at least one further layer. It is possible for the further layer to be enveloped by the second layer or to envelop the second layer. The further layer can abut against the second layer. It is possible for the aggregate Z in the further layer/in the further layers to make up the same weight portion GZ as in the case of the first layer.

It may be advantageous for the first layer to abut against the second layer and/or envelop the second layer or to be enveloped by the second layer. The first layer is expediently adjusted to the second layer with respect to dielectric heating or softening, so that an aggregate is not required in the second layer. The abutment of layers is of importance in particular in the second case or in the second and third subcases, in which the heat is radiated from the first layer.

It is possible and in several cases preferred for the second layer to have no solid and nonconducting or semiconducting aggregate. It is possible for the pipe to have a different layer comprised of plastic or other layers comprised of plastic without solid and semiconducting or nonconducting aggregates. The plastic of the other layer/other layers preferably comprises a polymer from the polymer class of plastic K2. It is further preferable that plastic K2 have the same polymer as the other layer/the other layers. The second layer and the other layer/the other layers can comprise the same plastic K2. The absorption factor AK2 of the second layer is advantageously larger than the absorption factors of the remaining layers of the pipe.

It is preferred that the first plastic K1 and the second plastic K1 be thermoplastic, so that the conversion temperatures TUK1 and TUK2 expediently depend on the accompanying melting temperatures. The first conversion temperature TUK1 divided by the second conversion temperature TUK2 preferably defines a conversion temperature ratio UV, wherein AK1 divided by AK2 defines an absorption ratio AVK, wherein the conversion temperature ratio UV divided by the absorption ratio AVK defines a primary ratio HVK, so that $$HV_K = \frac{UV}{AV_K} = \frac{T_{UK1}}{A_{K1}} \cdot \frac{A_{K2}}{T_{UK2}}$$

applies, wherein a difference factor UFK is determined from the primary ratio HVK according to $$UF_K = \begin{matrix} HV_K, & HV_K > 1 \\ 1/HV_K, & HV_K < 1 \end{matrix}$$

wherein AS1 divided by AS2 defines an absorption ratio AVS, wherein the conversion temperature ratio UV divided by the absorption ratio AVS defines a primary ratio HVS, so that $$HV_S = \frac{UV}{AV_S} = \frac{T_{UK1}}{A_{S1}} \cdot \frac{A_{S2}}{T_{UK2}}$$

applies, wherein a difference factor UFS is determined from the primary ratio HVS according to $$UF_S = \begin{matrix} HV_S, & HV_S > 1 \\ 1/HV_S, & HV_S < 1 \end{matrix}$$

wherein the inequality U $$UF_S < UF_K$$

is satisfied. A respective difference factor UFK or UFS between HVS or HVK to the value 1 is preferably determined, wherein the respective difference factor UF corresponds to the respective primary ratio HV if the primary ratio HV is greater than 1. Otherwise, the respective difference factor UF corresponds to the reciprocal value of the respective primary ratio HV. As a consequence, the difference factor assumes a value of 1 in the ideal case, and gets worse the greater it is than 1.

It was found to be very advantageous for the individual layer to be adjusted to the respective conversion temperature TU or melting temperature of the plastic of the respective layer in terms of its individual heat absorption by adding an aggregate Z. In one very essential finding, this adjustment is preferably made in such a way that the absorption ratio AVS of the two layers approximates the conversion temperature ratio UV of the two plastics through the addition of the aggregate Z. In this way, the heat of dielectric heating is better distributed to the layers, so that the softening of the first and second layers are approximated to each other. If the difference factor UFS runs against 1, the two layers are softened to about the same extent. This yields an especially fast and gentle bend (first case).

It is preferred that the difference factor UFS assume a value of at most 20, preferably of at most 10, further preferentially of at most 5, especially preferentially of at most 2, very especially preferentially of at most 1.5, and in an ideal case of at most 1.2.

It is possible for the pipe to have one additional layer or several additional layers made out of plastic, wherein the additional layer or the additional layers comprise(s) an aggregate Y with a weight portion GY, wherein aggregate Y is a nonconducting or semiconducting solid. The absorption factor AY of the respective aggregate Y of the additional layer is advantageously larger than that of the plastic of the respective additional layer. It is preferred that the plastic of the additional layer/the additional layers be different than plastic K1 and/or K2. The plastic of the additional layer/additional layers preferably comprises a different polymer than plastic K1 and/or K2. It is very preferred that the polymer of the plastic of the additional layer/the additional layers be selected from a different polymer class than plastic K1 or K2. It is especially advantageous that absorption factor AY be larger than absorption factor AS2 or AK2. Absorption factor AY is preferably larger than AS2 or AK2 by at least a factor of 1.5 or 2 or 2.5 or 3.

In particular, it lies within the framework of the present disclosure that the layer or the layers with a semiconducting or nonconducting solid or the first layer or the first layer and the other layer/the other layers/the further layer/the further [layers] comprise(s) more than 50% or 70% or 90% or 95% of the weight of the pipe. It is possible for the second layer or the second layer and the other layer/the other layers to comprise less than 50% or 30% or 10% or 5% of the weight of the pipe. Despite an insufficient softening of the second layer, this makes it possible to perform a bending process within a short period of time, since the first layer keeps the second layer in the bent shape due to its mechanical stability (second subcase).

It is advantageous that inequality U be satisfied even at a temperature of 80° C. and preferably even of 140° C. According to a preferred embodiment, inequality U is satisfied even at an excitation frequency of 20 MHz, and advantageously even of 40 MHz.

It is possible for the second layer to have an aggregate X, to which a weight portion GX is allocated. Weight portion GX is determined relative to the weight of the second layer. The following then applies for determining AS2:

$$G_{K2} \cdot A_{K2} + G_X \cdot A_X = A_{S2}$$

Therefore, AK2 can also be determined by removing the plastic portion if the second layer has an aggregate X.

Aggregate Z and/or aggregate Y and/or aggregate X is especially preferably a crystalline material. It is very advantageous that aggregate Z and/or aggregate Y and/or aggregate X be an inorganic and preferably a ceramic material.

In particular, aggregate Z and/or aggregate Y and/or aggregate X can have a metal oxide, wherein the metal oxide is preferably selected from the group "zinc oxide, zirconium dioxide, titanium-containing metal oxide". The titanium-containing metal oxide is preferably selected from the group "titanium dioxide, magnesium titanate, strontium titanate, barium titanate". However, aggregate Z and/or aggregate Y and/or aggregate X can also have molybdenum disulfide. These materials have large absorption factors, so that only small quantities need be mixed in with the layers, and the properties of the layers otherwise remain practically unchanged.

According to a preferred embodiment, absorption factor AZ and/or absorption factor AY and/or absorption factor AX is larger than 0.002, preferably larger than 0.005, further preferably larger than 0.01, preferentially larger than 0.02 and further preferentially larger than 0.05, especially preferentially larger than 0.1, and very especially preferentially larger than 0.15 or even larger than 0.2. It is advantageous that absorption factor AZ and/or absorption factor AY and/or absorption factor AX be less than 100, further preferably less than 30 and especially preferably less than 10. The advantage to large absorption factors is that only a small quantity of the respective aggregate must be mixed in, so that the respective layer hardly changes its other properties. Given larger particles, excessively high values for the absorption factors can cause local micro-burns.

It is expedient for the weight portion GZ relative to the first layer and/or the weight portion GY relative to the additional layer and/or the weight portion GX relative to the second layer to measure at least 0.0001, preferentially at least 0.001, further preferentially at least 0.01, and especially preferentially at least 0.1. It lies within the framework of the disclosure that the weight portion GZ relative to the first layer and/or the weight portion GY relative to the additional layer and/or the weight portion GX relative to the second layer measures at most 0.5, and preferably at most 0.3.

It is preferred that aggregate Z and/or aggregate Y and/or aggregate X be in powder form. An average particle diameter for aggregate Z and/or aggregate Y and/or aggregate X advantageously measures at most 500 μm or 200 μm or 100 μm or 50 μm or 20 μm or 10 μm. This permits or simplifies the manufacture of correspondingly thin layers, and ensures the best possible heat distribution.

It is preferred that the first layer or the second layer be a barrier layer. According to a preferred embodiment, the second layer is the barrier layer. The material of the barrier layer preferentially comprises a plastic, which is selected from the group "EVOH, fluoropolymer, PPA, polyolefin, PVDC, TPE", wherein in particular EVOH, fluoropolymers, PPA or PVDC are preferred as plastics for the barrier layer, and EVOH is the most preferred plastic for the barrier layer. It is expedient for the barrier layer to be arranged between an innermost and outermost layer. According to an embodiment, the second layer or the barrier layer is the innermost layer. It is possible for the barrier layer to form the innermost layer, and preferably comprise a fluoropolymer.

It is possible for the pipe to comprise n layers, wherein at least n-1 layers each preferably have at least one aggregate Z, Y, X. It is advantageous that the layer j with the plastic having the largest absorption factor AKj comprise no aggregate. Given more than two layers, the difference factor UFS or UFK can be written as UFSij or UFKij, wherein i stands for a different respective layer than layer j. It is preferred that all difference factors UFSij be smaller than 20 or 10 or 5 or 2 or 1.5 or 1.2. With respect to at least two and ideally all difference factors UFSij, it advantageously applies that they be smaller than the respective accompanying difference factor UFKij.

It lies within the framework of the present disclosure that the pipe have at least one bending point, preferably at least two or three and especially preferably at least four or five bending points. The pipe is preferably coextruded, and further preferably in one piece. In particular, the term "in one piece" means that the pipe can only be divided into several pieces in a destructive manner.

The outer diameter of the pipe expediently measures at most 30 mm, and preferably at most 20 mm. It is preferred that the wall thickness of the pipe wall come to 0.1 mm to 5 mm, and further preferably to 0.3 mm to 3 mm. It is possible for the layer thickness of the first layer and/or the second layer to measure 0.05 mm to 1.5 mm, and especially preferably 0.1 mm to 0.5 mm.

In order to achieve the aforementioned object, the present disclosure recommends a fluid line with a pipe according to the disclosure, wherein the fluid line has a respective line connector at both ends of the pipe, wherein at least one of the line connectors can be reversibly connected with a counterpart. The at least one line connector can advantageously be reversibly latched with the counterpart. It is preferred that the at least one line connector comprise a female coupling body. The coupling body is expediently designed to receive the counterpart in a fluid tight manner. The counterpart is expediently configured as a male connector, and preferentially comprises a connector shaft and a collar that runs around the connector shaft or a groove that runs around the connector shaft.

The at least one line connector preferably has a retainer, wherein the line connector is preferably designed in such a way that the retainer—during insertion of the male connector into the coupling body—latches the male connector into the coupling body using the circumferential collar/the circumferential groove. The retainer is preferably annular, in particular shaped like an oval ring or circular ring, or U-shaped in design. The retainer expediently comprises spreadable arms. It is preferred that the arms can be elastically spread apart during insertion of the counterpart, and, with the counterpart completely inserted, latch the male connector into the coupling body using the circumferential collar/the circumferential groove.

BRIEF DESCRIPTION OF THE DRAWINGS

The present disclosure will be explained in more detail below based on a drawing, which only represents an exemplary embodiment. Shown schematically on.

DETAILED DESCRIPTION

Figure 1:
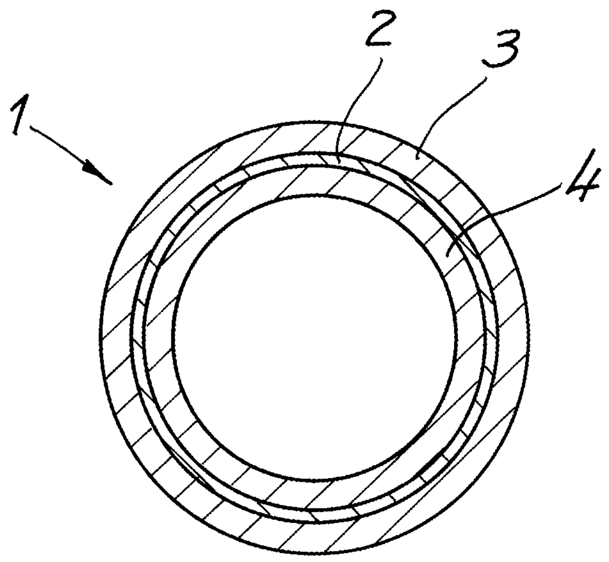
FIG. 1 is a cross section through a pipe according to the disclosure.

According to FIG. 1, the inventive pipe 1 has three layers 2, 3, 4, wherein the middle layer 2 is a barrier layer and comprises EVOH. The outer layer 3 as well as the inner layer 4 each have a polyamide 6, wherein the polyamide 6 of the inner layer 4 is identical to the polyamide 6 of the outer layer 3. The polyamide 6 can have an absorption factor of 0.1, while the middle layer 2 made of EVOH has an absorption factor of 0.6 in this exemplary embodiment. The outer layer 3 made of polyamide 6 can be understood as the "first layer" with a first plastic K1, while the middle layer 2 is construed below as the "second layer" with a second plastic K2. The inner layer 4 in this exemplary embodiment can be understood as an "other layer", which likewise has the first plastic K1.

As a consequence, absorption factor AK1 comes to a value of 0.1, while absorption factor AK2 measures 0.6. Both plastics K1 (PA6) and K2 (EVOH) are thermoplastic, so that their conversion point corresponds to their melting point minus 20° C. The conversion temperature TUK1 of polyamide 6 in this exemplary embodiment thus measures 200 K (=200° C.-20° C.), while the conversion temperature TUK2 of EVOH in this exemplary embodiment can measure 163 K (=183° C.-20° C.). Because the absorption factor is six times higher and the melting point is lower, dielectric heating brings the EVOH (second layer 2) to a temperature at which the EVOH can be readily bent much faster. However, the two polyamide layers (the first layer 3 and the other layer 4) are not yet sufficiently heated at the same point in time, so that they cannot be readily bent yet. If the pipe is further heated until the two polyamide layers also allow a satisfactory bending, the middle layer is heated so strongly that it literally burns, and loses its good barrier properties almost completely. In the present exemplary embodiment, the primary ratio HVK is calculated as follows:

$$HV_K = \frac{UV}{AV_K} = \frac{T_{UK1}}{T_{UK2}} \cdot \frac{A_{K2}}{A_{K1}} = \frac{200}{163} \cdot \frac{0.6}{0.1} = 7.3$$

wherein HVK>1, so that the difference factor UFK likewise measures 7.3.

According to the disclosure, an aggregate Z in the form of powdered zirconium oxide (also known as zirconia) is mixed in with the first layer 3 and the other layer 4. This aggregate Z is a metal oxide, is present in a crystalline form, and can have an absorption factor AZ with the value of 2. As a consequence, aggregate Z has an absorption factor that is larger by about a factor of 20 than that of polyamide 6, and larger by a factor of 3 than that of EVOH. The weight portion GZ of aggregate Z in the two polyamide layers can measure 10% or 0.1. As a consequence, the absorption factor AS1 of the first layer 3 and absorption factor ASW of the other layer 4 is calculated as follows:

$$A_{S1}=A_{SW}=G_{K1}\cdot A_{K1}+G_Z\cdot A_Z=0.9\cdot 0.1+0.1\cdot 2=0.29$$

so that absorption factor AS1 and ASW was nearly tripled by mixing in aggregate Z. By contrast, absorption factor AS1 remains constant, and is thus identical to AK2. Therefore, the following value results for the primary ratio HVS:

$$HV_S = \frac{UV}{AV_S} = \frac{T_{UK1}}{T_{UK2}} \cdot \frac{A_{S2}}{A_{S1}} = \frac{200}{163} \cdot \frac{0.6}{0.29} = 2.5 = UF_S$$

As a result, difference factor UFS is smaller than difference factor UFK, so that inequality U is satisfied for the first layer 3. This also applies equally for the other layer 4, which consists of the same material as the first layer 3, and can consequently stem from the same polymer melt source.

Figure 2:
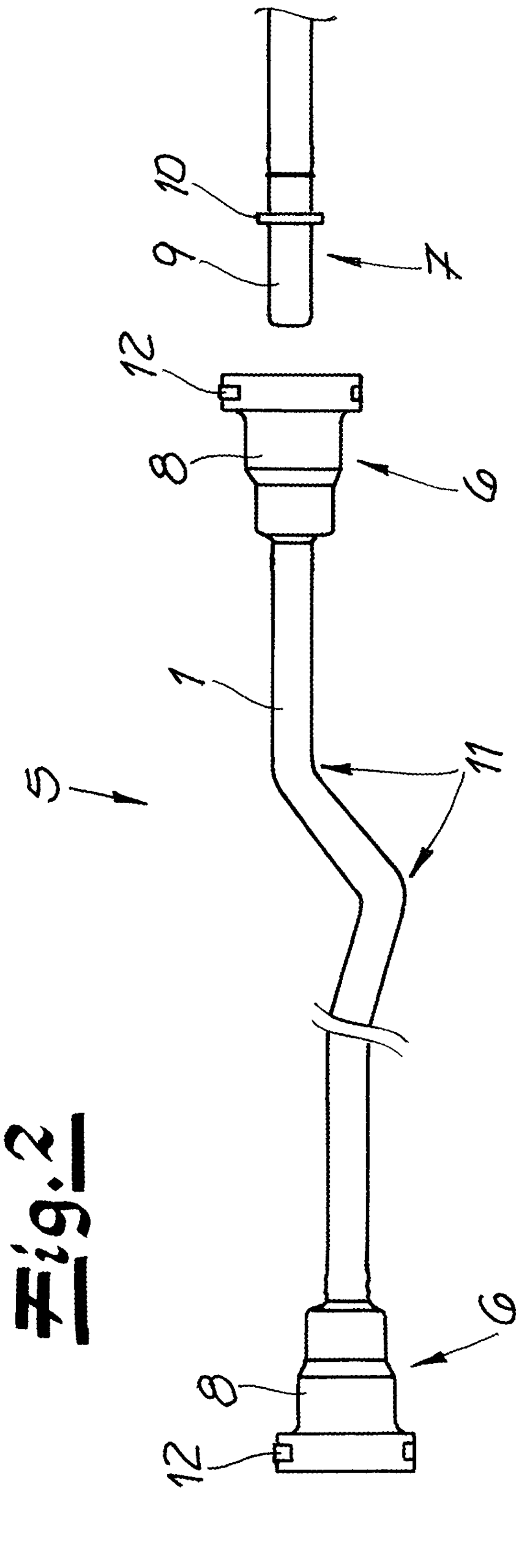
FIG. 2 is a side view of a fluid line according to the disclosure, comprising the pipe on FIG. 1, and further having two line connectors.

FIG. 2 shows the pipe 1 on FIG. 1 as a constituent of a complete fluid line 5. Apart from the pipe 1 with bending points 11, the fluid line 5 in this exemplary embodiment also comprises two line connectors 6, which each are arranged at one end of the pipe 1. The line connectors 6 in this exemplary embodiment are designed as female line connectors 6, and capable of receiving male counterparts 7. Shown on the right side of FIG. 2 is such a male counterpart 7, which on its part can be connected to a pipe (as denoted), or even to other components (pumps, tanks, etc.). The counterpart in this exemplary embodiment comprises a connector shaft 9 as well as a circumferential collar 10.

For purposes of connection with the counterpart 7, the line connectors 6 each have a coupling body 8 with a female design, for example which is fastened to the pipe 1 via a frictional or substance-to-substance connection. For example, the substance-to-substance connection can be designed as a laser weld seam. For example, a frictional connection can be established via circumferential ribs of the coupling body 8, onto which the end of the pipe 1 is pushed. The coupling body 8 receives the connector shaft 9 of the counterpart 7, and its interior preferentially has an O-ring (not shown here) for sealing purposes.

Figure 3:
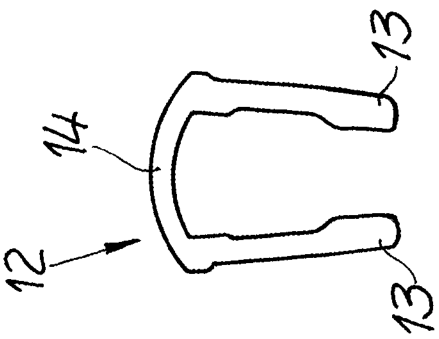
FIG. 3 is a front view of a retainer respectively arranged in the two line connectors.

The line connector and the accompanying counterpart 7 can advantageously be reversibly connected with each other, which ideally is achieved via a latched connection. For this purpose, a retainer 12 is pushed into the coupling body 8, wherein the retainer 12 preferably has a U-shaped design, see FIG. 3. The retainer 12 has a head section 14 as the U-base, as well as two arms 13 as the U-legs. The arms 13 can be elastically spread apart via the circumferential collar 10 of the counterpart 7, so that after passing the circumferential collar 10, the two arms 13 assume their original position once more, and latch the counterpart 7 back into the coupling body 8 again. The two arms 13 can be spread apart by pressing on the head section 14 and correspondingly configuring the coupling body 8, for example, so that the counterpart 7 can thereupon be pulled out of the coupling body 8.

What is claimed is:

1. A pipe comprising:

at least one first layer and one second layer, wherein the first layer has a first plastic K1, wherein the first plastic K1 has a conversion temperature $T_{UK1}$, wherein the second layer (2) comprises a second plastic K2, wherein the second plastic K2 has a conversion temperature $T_{UK2}$, wherein the first layer (3) has an aggregate Z, wherein aggregate Z is not a polymer or copolymer;

wherein an imaginary portion of a relative permittivity standardized by the electric field constant is allocated to the first plastic K1, and referred to as absorption factor $A_{K1}$, wherein an imaginary portion of a relative permittivity standardized by the electric field constant is allocated to the second plastic K2, and referred to as absorption factor $A_{K2}$, wherein an imaginary portion of a relative permittivity standardized by the electric field constant is allocated to aggregate Z, and referred to as absorption factor $A_Z$, wherein an absorption factor $A_{S1}$ is allocated to the first layer and an absorption factor $A_{S2}$ is allocated to the second layer, wherein absorption factors $A_{K1}$ and $A_Z$ at least codetermine the absorption factor $A_{S1}$ of the first layer via their mixing ratio in the first layer, wherein the absorption factor $A_{K2}$ of the second plastic K2 at least codetermines absorption factor $A_{S2}$ of the second layer;

wherein absorption factor $A_Z$ is larger than absorption factor $A_{K1}$;

wherein aggregate Z is a solid, wherein the solid is a semiconductor or non-conductor, and wherein the electrical conductivity of the pipe in a longitudinal direction of the pipe is less than $10^{-8}$ S/m.

2. The pipe according to claim 1, wherein absorption factor $A_Z$ is larger than absorption factor $A_{S2}$ or $A_{K2}$.

3. The pipe according to claim 1, wherein the plastic K1 of the first layer comprises a polymer, which is selected from one of the polymer classes "aromatic polyamide (PA), aliphatic PA, partially aromatic PA, polyester (PES), polyetherketone (PEK), ethylene-vinyl alcohol copolymer (EVOH), fluoropolymer (FP), polyvinylidene chloride (PVDC), polyphenylene sulfide (PPS), polyurethane (PU), thermoplastic elastomer (TPE), polyolefin (PO)", wherein the plastic K2 of the second layer comprises a polymer selected from another of the mentioned polymer classes.

4. The pipe according to claim 1, wherein the pipe has at least one further layer made out of plastic, wherein the at least one further layer has aggregate Z.

5. The pipe according to claim 1, wherein the pipe has at least one additional layer made out of plastic, wherein the at least one additional layer comprises an aggregate Y with a weight portion $G_Y$, wherein aggregate Y is a non-conducting or semiconducting solid.

6. The pipe according to claim 1, wherein the first layer or the layers with a semiconducting or non-conducting solid comprise(s) more than 50% of the weight of the pipe.

7. The pipe according to claim 1, wherein aggregate Z and/or aggregate Y is crystalline such as a metal oxide.

8. The pipe according to claim 1, wherein aggregate Z and/or aggregate Y is in powder form, wherein the average particle diameter of aggregate Z and/or of aggregate Y measures at most 100 μm.

9. The pipe according to claim 1, wherein the pipe has at least one bending point.

10. The pipe according to claim 1, wherein the electrical conductivity of the pipe in a longitudinal direction of the pipe is less than $10^{-9}$ S/m.

11. The pipe according to claim 1, wherein the first layer or the layers with a semiconducting or non-conducting solid comprises more than 90% of the weight of the pipe.

12. The pipe according to claim 1, wherein the pipe has at least two bending points.

13. The pipe according to claim 1, wherein the first plastic K1 and the second plastic K1 are thermoplastic, wherein the first conversion temperature $T_{UK1}$ divided by the second conversion temperature $T_{UK2}$ defines a conversion temperature ratio UV, wherein $A_{K1}$ divided by $A_{K2}$ defines an absorption ratio $AV_K$, wherein the conversion temperature ratio UV divided by the absorption ratio $AV_K$ defines a primary ratio $HV_K$, so that $$HV_K = \frac{UV}{AV_K} = \frac{T_{UK1}}{A_{K1}} \cdot \frac{A_{K2}}{T_{UK2}}$$

applies, wherein a difference factor $UF_K$ is determined from the primary ratio $HV_K$ according to $$UF_K = \begin{matrix} HV_K, & HV_K > 1 \\ 1/HV_K, & HV_K < 1 \end{matrix}$$

wherein $A_{S1}$ divided by $A_{S2}$ defines an absorption ratio $AV_S$, wherein the conversion temperature ratio UV divided by the absorption ratio $AV_S$ defines a primary ratio $HV_S$, so that $$HV_S = \frac{UV}{AV_S} = \frac{T_{UK1}}{A_{S1}} \cdot \frac{A_{S2}}{T_{UK2}}$$

applies, wherein a difference factor $UF_S$ is determined from the primary ratio $HV_S$ according to $$UF_S = \begin{matrix} HV_S, & HV_S > 1 \\ 1/HV_S, & HV_S < 1 \end{matrix}$$

wherein the inequality U $$UF_S < UF_K$$

is satisfied.

14. The pipe according to claim 13, wherein the difference factor $UF_S$ assumes a value of at most 5, and further preferentially of at most 2.

15. The pipe according to claim 1, wherein one of the layers is a barrier layer, wherein the material of the barrier layer has a plastic, which is selected from the group "ethylene-vinyl alcohol copolymer, fluoropolymer, polyphthalamide, polyolefin, polyvinylidene chloride, thermoplastic elastomer".

16. The pipe according to claim 15, wherein absorption factor $A_{K2}$ is larger than $A_{K1}$.

17. A fluid line comprising a pipe, wherein the pipe is designed according to claim 1, wherein the fluid line has a respective line connector at ends of the pipe, wherein at least one of the line connectors can be reversibly connected with a counterpart.

* * * * *